(12) United States Patent
Huang et al.

(10) Patent No.: US 10,750,535 B2
(45) Date of Patent: *Aug. 18, 2020

(54) APPARATUS, SYSTEM AND METHOD OF NEIGHBOR AWARENESS NETWORKING (NAN) COMMUNICATION

(71) Applicant: INTEL IP CORPORATION, Santa Clara, CA (US)

(72) Inventors: Po-Kai Huang, San Jose, CA (US); Emily H. Qi, Gig Harbor, WA (US); Minyoung Park, San Ramon, CA (US); Dibakar Das, Troy, NY (US)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/120,367

(22) Filed: Sep. 3, 2018

(65) Prior Publication Data
US 2019/0132864 A1    May 2, 2019

Related U.S. Application Data

(63) Continuation of application No. 14/757,949, filed on Dec. 24, 2015, now Pat. No. 10,091,811.
(Continued)

(51) Int. Cl.
*H04W 4/06* (2009.01)
*H04W 8/00* (2009.01)
(Continued)

(52) U.S. Cl.
CPC ........ *H04W 74/002* (2013.01); *H04W 4/06* (2013.01); *H04W 8/005* (2013.01); *H04W 8/24* (2013.01);
(Continued)

(58) Field of Classification Search
CPC ....... H04L 45/20; H04L 67/104–1093; H04W 4/005–006; H04W 4/08; H04W 4/20;
(Continued)

(56) References Cited

U.S. PATENT DOCUMENTS

| | | | |
|---|---|---|---|
| 10,091,811 B2 * | 10/2018 | Huang | ............... H04W 74/002 370/329 |
| 2011/0200072 A1 | 8/2011 | Hong et al. | |

(Continued)

FOREIGN PATENT DOCUMENTS

| | | |
|---|---|---|
| WO | 2014185954 | 11/2014 |
| WO | 2016085247 | 6/2016 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Timothy J Weidner
(74) *Attorney, Agent, or Firm* — Shichrur & Co.

(57) ABSTRACT

Some demonstrative embodiments include apparatuses, systems and/or methods of communicating over a data path. For example, an apparatus may include logic and circuitry configured to cause a Neighbor Awareness Networking (NAN) device to generate a message including an indication of a plurality of communication resources and one or more availability type indications corresponding to the plurality of communication resources, an availability type indication corresponding to a communication resource is configured to indicate an availability mode of the NAN device to com- (Continued)

municate data over a data path using the communication resource; and to transmit the message.

23 Claims, 6 Drawing Sheets

Related U.S. Application Data

(60) Provisional application No. 62/149,735, filed on Apr. 20, 2015.

(51) Int. Cl.
| | |
|---|---|
| *H04W 8/24* | (2009.01) |
| *H04W 28/12* | (2009.01) |
| *H04W 40/24* | (2009.01) |
| *H04W 48/16* | (2009.01) |
| *H04W 72/12* | (2009.01) |
| *H04W 74/00* | (2009.01) |
| *H04W 84/18* | (2009.01) |
| *H04W 88/02* | (2009.01) |
| *H04W 92/18* | (2009.01) |

(52) U.S. Cl.
CPC ........... *H04W 28/12* (2013.01); *H04W 40/24* (2013.01); *H04W 48/16* (2013.01); *H04W 72/1205* (2013.01); *H04W 72/1278* (2013.01); *H04W 84/18* (2013.01); *H04W 88/02* (2013.01); *H04W 92/18* (2013.01)

(58) Field of Classification Search
CPC ................. H04W 4/206; H04W 8/005; H04W 8/22–245; H04W 28/0247; H04W 28/10–14; H04W 40/02; H04W 40/24; H04W 48/16; H04W 48/18; H04W 56/00–0025; H04W 72/00–14; H04W 74/002; H04W 74/08; H04W 76/02; H04W 84/02; H04W 84/12; H04W 84/18–22; H04W 88/02; H04W 92/18

See application file for complete search history.

(56) References Cited

U.S. PATENT DOCUMENTS

| | | |
|---|---|---|
| 2012/0170534 A1 | 7/2012 | Kim et al. |
| 2013/0329693 A1 | 12/2013 | Lee et al. |
| 2014/0254566 A1 | 9/2014 | Qi et al. |
| 2016/0150392 A1* | 5/2016 | Jung ............... H04W 8/005 455/450 |
| 2016/0165653 A1* | 6/2016 | Liu ............... H04W 8/005 370/329 |
| 2016/0309462 A1 | 10/2016 | Huang et al. |

FOREIGN PATENT DOCUMENTS

| | | |
|---|---|---|
| WO | 2016094364 | 6/2016 |
| WO | 2016094441 | 6/2016 |

OTHER PUBLICATIONS

Wi-Fi Neighbour Awareness Networking (NAN), Technical Specification, Version 1.0, May 1, 2015, 98 pages.
Wi-Fi Peer-to-Peer (P2P), Technical Specification, Version 1.5, 2014, Aug. 4, 2014, 183 pages.
International Search Report and Written Opinion for PCT/US2016/023328, dated Jul. 8, 2016, 13 pages.
International Preliminary Report on Patentability for PCT/US2016/023328, dated Nov. 2, 2017, 10 pages.
Office Action for U.S. Appl. No. 14/757,949, dated Oct. 5, 2017, 17 pages.
Office Action for U.S. Appl. No. 14/757,949, dated Feb. 8, 2018, 20 pages.
European Search Report for European Patent Application No. 16783549.5, dated Nov. 6, 2018, 12 pages.
Camps-Mur, Daniel et al: "Enabling always on service discovery: Wifi neighbor awareness networking", Technical Report of Wireless Networking Group, Coordinated Science Laboratory; Dept. Electrical and Computer Engineering; University of Illinois at Urbana-Champaign, US, vol. 22 No. 2, Apr. 1, 2015 (Apr. 1, 2015), 8 pages.
Office Action for European Patent Application No. 16783549.5, dated May 18, 2020, 7 pages.

* cited by examiner

| 1 | 0 | 1 | 0 | 1 | 1 | 1 | 0 | 0 | 1 | 1 | 0 | 0 | 0 | 0 | 1 |

Indicate another x bytes is used for channel indication x=1 in this example

| 1 | 0 | 0 | 0 | 0 | 0 | 0 | 0 |

This additional 8 bits indicate the availability of next 8 channels.

APPARATUS, SYSTEM AND METHOD OF NEIGHBOR AWARENESS NETWORKING (NAN) COMMUNICATION

CROSS REFERENCE

This application claims the benefit of and priority from U.S. Provisional Patent Application No. 62/149,735 entitled "APPARATUS, SYSTEM AND METHOD OF COMMUNICATING CHANNEL INFORMATION BETWEEN AWARENESS NETWORKING DEVICES", filed Apr. 20, 2015, the entire disclosure of which is incorporated herein by reference.

TECHNICAL FIELD

Embodiments described herein generally relate to communicating over a data path.

BACKGROUND

Awareness networking, for example, according to a Wireless Fidelity (Wi-Fi) Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic illustration of a channel bitmap, in accordance with some demonstrative embodiments.

DETAILED DESCRIPTION

Figure 1:
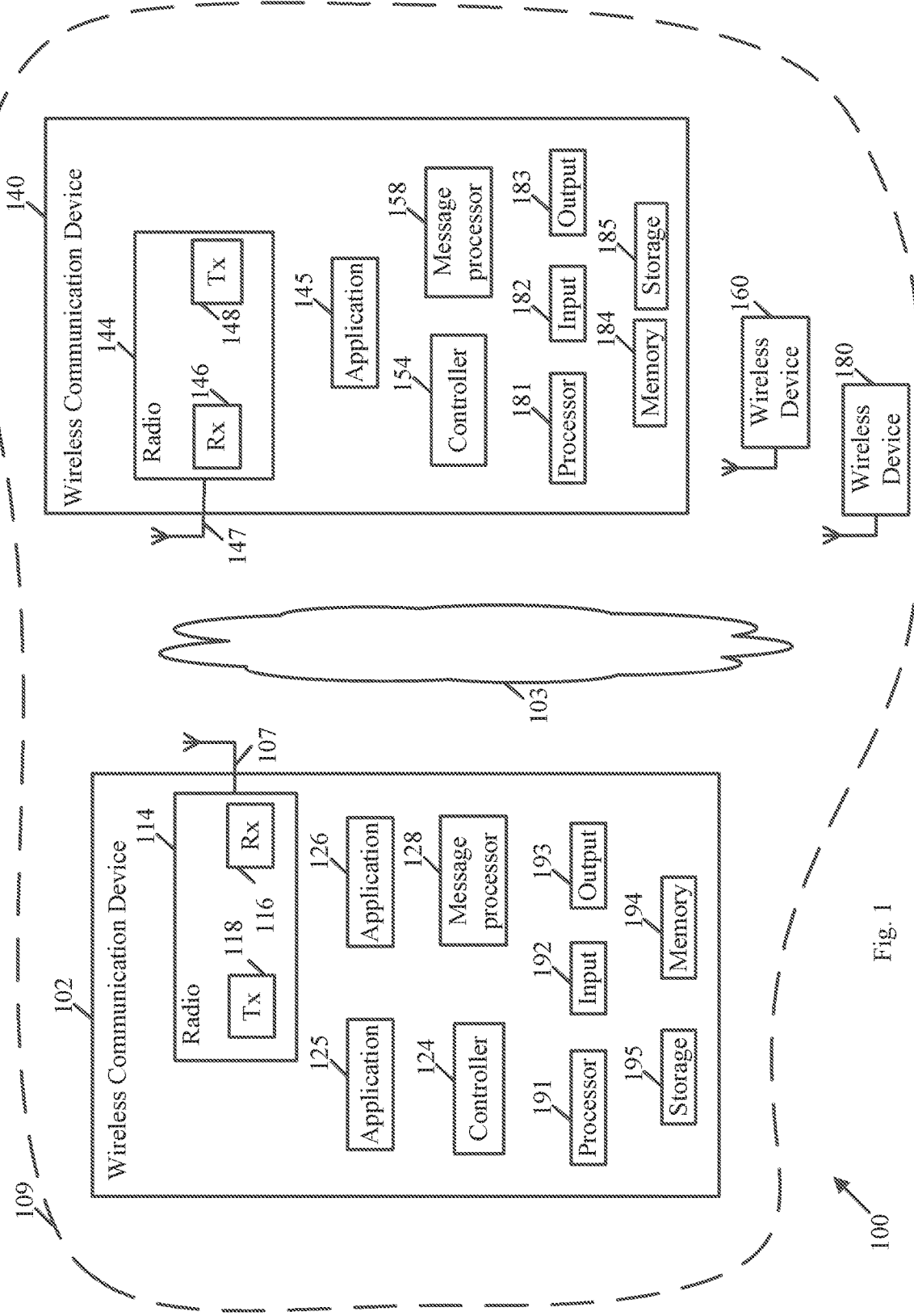
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version* 1.0, May 1, 2015) and/or future versions and/or derivatives thereof, devices and/or networks operating in accordance with existing WFA Peer-to-Peer (P2P) specifications (*WiFi P2P technical specification, version* 1.5, Aug. 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; *IEEE*802.11*ac*-2013 ("*IEEE P*802.11*ac*-2013, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 4: *Enhancements for Very High Throughput for Operation in Bands below* 6*GHz*", December, 2013); *IEEE* 802.11*ad* ("*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*", 28

Dec. 2012); and/or IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one or more devices of wireless communication devices 102, 140, 160 and/or 180, e.g., device 140, may include, or may perform the functionality of, an Access Point (AP), e.g., as described below.

For example, the AP may include a router, a PC, a server, a Hot-Spot and/or the like.

In some demonstrative embodiments, one or more devices of wireless communication devices 102, 140, 160 and/or 180, e.g., device 102, may perform the functionality of a non-AP STA, and/or one or more devices of wireless communication devices 102, 140, 160 and/or 180, e.g., device 140, may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may perform the functionality of one or more WFD devices.

In one example, wireless communication devices 102, 140, 160 and/or 180 may include, or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may perform the functionality of WFD P2P devices. For example, devices 102, 140, 160 and/or 180 may be able to perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, share, and/or use one or more services, e.g., a social application, a file sharing application, a gaming application, a media application and/or the like, for example, using an awareness network, NAN network ("WiFi Aware network"), a PTP network, a P2P network, WFD network, and/or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more functionalities of devices 102, 140, 160 and/or 180, for example, one or more functionalities of communication, e.g., awareness networking communications, WiFi Aware (NAN) communication and/or any other communication, between devices 102, 140, 160 and/or 180 and/or other devices, and/or any other functionality, e.g., as described below. For example, device 102 may include a controller 124, and/or device 140 may include a controller 154.

In some demonstrative embodiments, controllers 124 and/or 154 may be configured to perform one or more functionalities, communications, operations and/or procedures between wireless communication devices 102, 140, 160 and/or 180, and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of c controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In one example, controller 154 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In one example, message processors 128 and/or 158 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may perform the functionality of a device or station, for example, an awareness networking device, a NAN device, a WiFi device, a WiFi Aware device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication devices 102, 140, 160 and/or 180, may include one or more blocks and/or entities to perform network awareness functionality. For example, a device, e.g., devices 102, 140, 160 and/or 180, may be capable of performing the functionality of a NAN device, may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., a directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 140, 160 and/or 180 may transmit discovery frames, e.g., SDFs, during the plurality of DWs, e.g., over the social channel. For example the NAN AM may advertize the time of the DW, during which NAN devices may exchange SDFs.

In one example, devices 102, 140, 160 and/or 180 may transmit the discovery frames to discover each other, for example, to enable using the one or more services provided by applications 125 and/or 126.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability Attribute is to be awake and available to send and/or receive data in a specified method.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form a NAN cluster 109 and may synchronize to the same clock, e.g., as described above.

In one example, all devices of the same cluster, e.g., NAN cluster 109, may converge on a time period and channel, e.g., a discovery window (DW), to facilitate the discovery of services of devices 102, 140, 160 and/or 180, and/or to achieve low power consumption, e.g., as described above.

In some demonstrative embodiments, devices 102, 140, 160 and/or 180 may perform a discovery procedure, for example, according to a Wi-Fi Aware specification and/or any other specification, before data transmission between devices 102, 140, 160 and/or 180.

In some demonstrative embodiments, devices 102, 140, 160 and/or 180 may be configured to enable data transmission for a specific service among multiple devices (also referred to as "Wi-Fi Aware data path"), post service discovery, e.g., after the discovery process.

In some demonstrative embodiments, after the discovery process, a set of devices of a NAN cluster, e.g., devices 102, 140, 160 and/or 180, which may transmit to each other may form a group, e.g., a data path group ("data group/data link group").

In some demonstrative embodiments, the term "group" may be used with respect to a plurality of devices, e.g., a set of devices, as described herein. In other embodiments, any other terminology may be used to refer to and/or identify the plurality of devices.

In some demonstrative embodiments, devices of the data path group may meet on fixed time periods and channels, which may be referred to as "timeblocks", to communicate with each other.

In some demonstrative embodiments, the time blocks may be based on and/or built on, a top of the discovery framework, e.g., the DWs, between devices 102, 140, 160 and/or 180.

In some demonstrative embodiments, to enable data transmission post service discovery, e.g., an active data path between two devices, the two devices may be required to be available at a same channel at a same time.

In some demonstrative embodiments, when considering active data paths between two devices, it may be required to consider the resource constraints of each device of the NAN cluster.

In some demonstrative embodiments, a device may have specific constraints on one or more channels.

In one example, the device may only work on a specific wireless communication frequency band, e.g., the 2.4 GHz or 5 Ghz communication band.

In another example, the device may not want to use a specific channel for data path communication.

In another example, the device may prefer to use a specific channel for the data path communication.

In some demonstrative embodiments, using a further availability window information element, for example, to indicate an available channel and/or time blocks/slots of a device, may not be beneficial, e.g., as described below.

In some demonstrative embodiments, the further availability window information element may be communicated as part of an availability entry list field of an attribute.

In some demonstrative embodiments, the attribute may include an attribute identifier, a length of the attribute, an identifier of the further availability window, and an availability entry list field including a list of entries, e.g., as follows:

TABLE 1

| Field | Size (octets) | Value | Description |
| --- | --- | --- | --- |
| Attribute ID | 1 | 0x0A | Identifies the type of NAN attribute. |
| Length | 2 | Variable | Length of the following fields in the attribute. |
| Map ID | 1 | Variable | Identifies the Further Availability Map attribute. Value 16-255 are reserved. |
| Availability Entry List | Variable | Variable | Including one or more Availability Entries. The format of Availability Entry is defined in Table 5-28 |

In some demonstrative embodiments, an entry of the list of entries of the availability entry list field of Table 1 may include one or more fields, e.g., as follows:

TABLE 2

| Field | Size (Octets) | Value (Hex) | Description |
| --- | --- | --- | --- |
| Entry Control | 1 | Variable | Availability Entry control information, as defined in Table 5-29 (of NAN specification). |
| Operating Class | 1 | Variable | Indicating the frequency band the NAN Device will be available as defined in [3]. Annex E Table E-4 Global Operating Classes. |
| Channel Number | 1 | Variable | Indicating the channel the NAN Device will be available. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Entry Control field. A NAN device that sets the i-th bit of the Availability Intervals Bitmap to 1 shall be present during the corresponding i-th time interval in the operation channel indicated by the Operating Class and Channel Number fields in the same Availability Entry. A NAN device that sets the i-th bit of the Availability Intervals Bitmap to 0 may be present during the corresponding i-th time interval in the operation channel indicated by the Operating Class and Channel Number fields in the same Availability Entry. |

In some demonstrative embodiments, the attribute of Table 1 and the Availability Entry List field including an entry defined by Table 2 may not be able to indicate all the feasible channels.

For example, a NAN device may have 3 feasible channels, denoted channel 1, channel 2, and channel 3. According to this example, if the NAN device uses the further availability window of Table 2, the NAN device may only be capable to indicate that the NAN device is available on a specific channel, e.g., channel 3, and the available time blocks with respect to the specific channel.

Some demonstrative embodiments may add a channel signaling ability to a NAN device, e.g., devices 102, 140, 160 and/or 180, for example, to enable the NAN device to indicate availability information with respect to more than one specific channel.

Some demonstrative embodiments may add a channel signaling ability to a NAN device, e.g., devices 102, 140, 160 and/or 180, for example, to enable the NAN device to indicate on which channels the NAN device may be available, e.g., to indicate that the NAN device is available on channels 1, 2, and/or 3.

In some demonstrative embodiments, the NAN device, e.g., device 102, 140, 160 and/or 180, may be configured to indicate one or more preferences with respect to the indicated channels. For example, the NAN device may be able to indicate that the NAN device prefers channel 1 and channel 3, and prefers to avoid channel 2. This capability may be introduced, for example, in addition to any other capabilities of a NAN device, e.g., according to any existing NAN specification.

In some demonstrative embodiments, a NAN device, e.g., devices 102, 140, 160 and/or 180, may be configured to use signaling to indicate its available channels, e.g., as described below.

In some demonstrative embodiments, a device, e.g., devices 102, 140, 160 and/or 180, may be configured to signal a list of available channels, in which the device may be available for communication, e.g., as described below.

In some demonstrative embodiments, at least part of the information corresponding to the available channels and/or available time slots may be communicated as part of a channel bitmap, for example, to reduce the overhead of signaling, e.g., as described below.

In some demonstrative embodiments, the channel signaling ability may be used, for example, to enable and/or facilitate devices to negotiate and/or to agree on a common schedule, e.g., as described below with reference to FIG. 2.

Figure 2:
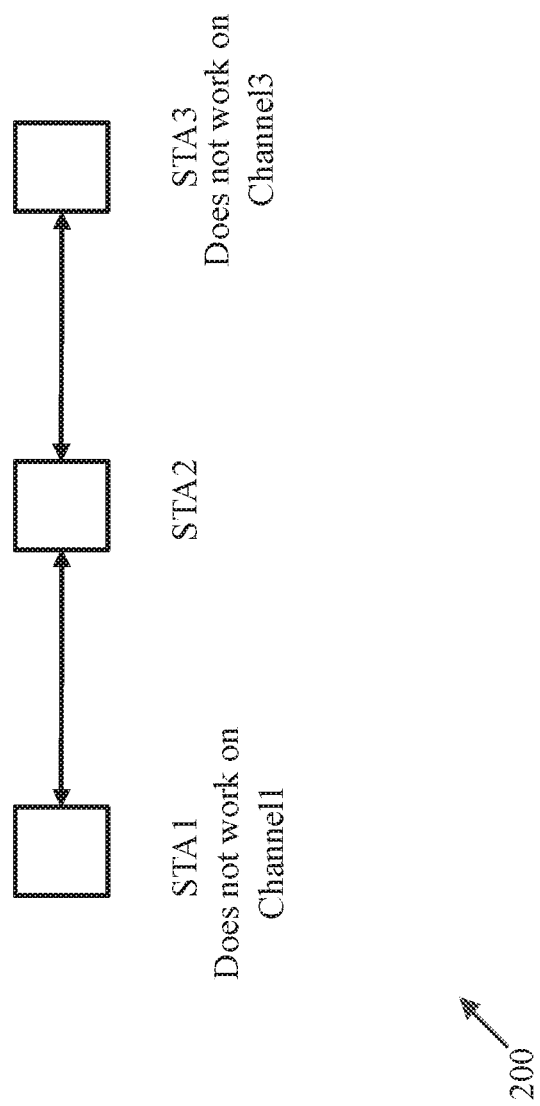
FIG. 2 is a schematic illustration of a communication scheme between three wireless stations, in accordance with some demonstrative embodiments.

Reference is made to FIG. 2, which schematically illustrates a communication scheme 200 between three wireless stations, in accordance with some demonstrative embodiments.

As shown in FIG. 2, the three stations may include a first station, denoted STA1, a second station, denoted STA2, and/or a third station, denoted STA3.

In one example, one or more of the three stations of FIG. 2 may perform the functionality of one or more respective devices of devices 102, 140, 160 and/or 180 (FIG. 1).

As shown in FIG. 2, the three stations may have channel constraints. For example, the STA1 may not be able to communicate over a first channel, denoted CH1, and may be able to communicate on a second channel, denoted CH2, and a third channel, denoted CH3; the STA2 may be able to communicate on the channel CH1, the channel CH2, and the channel CH3; and the STA3 may not be able to communicate on the channel CH3, and may be able to communicate on the channel CH1 and the channel CH2.

In some demonstrative embodiments, if each station of the STA1, the STA2, and/or the STA3 indicates only a single available channel, for example, STA1 indicates the channel CH3, STA2 indicates the channel CH1, and STA3 indicates the channel CH1, the STA1, the STA2, and/or the STA3 may not be able to agree on and/or it may be difficult for the STA1, the STA2, and/or the STA3 to agree on, a common schedule over which all the three STAs may be able to communicate.

In some demonstrative embodiments, if each station of the STA1, the STA2, and/or the STA3 indicates its channel constraints with respect to the three channels, e.g., as described herein, the STA1, the STA2, and the STA3 may be able to agree, for example, on a common schedule on channel 2, e.g., over which all three STAs may be able to communicate.

Referring back to FIG. 1, in some demonstrative embodiments a NAN device, e.g., device 102, 140, 160 and/or 180, may transmit channel signaling information, for example, to indicate channel availability and/or constraints of the NAN device, e.g., as described below.

In some demonstrative embodiments, device 102 may transmit the channel signaling information, for example, to devices 140, 160, and/or 180.

In some demonstrative embodiments, controller 124 may be configured to control, cause and/or trigger device 102 to generate a message including an indication of a plurality of communication resources and one or more availability type indications corresponding to the plurality of communication resources.

In some demonstrative embodiments, controller 124 may be configured to control, cause and/or trigger message processor 128 to generate the message.

In some demonstrative embodiments, the plurality of communication resources may include a plurality of wireless communication channels and/or one or more time resources, e.g., as described below.

In some demonstrative embodiments, an availability type indication corresponding to a communication resource may be configured to indicate an availability mode of device 102 to communicate data over a data path using the communication resource.

In some demonstrative embodiments, the availability type indication may be configured to indicate the availability mode of device 102, for example, with respect to two or more resources of the plurality of communication resources, e.g., as described below.

In some demonstrative embodiments, the availability type indication may be configured to indicate that device 102 is able to communicate data using the resource, that device 102 is unavailable to communicate data using the resource, that device 102 prefers to communicate data using the resource, or that device 102 prefers not to communicate data using the resource.

In some demonstrative embodiments, an availability mode with respect to a communication resource may indicate, for example, a constraint with respect to the communication resource, a communication preference with respect to the communication resource, and/or a capability and/or feasibility to communicate using the communication resource.

In some demonstrative embodiments, controller 124 may be configured to control, cause and/or trigger device 102 to transmit the message.

For example, controller 124 may be configured to control, cause and/or trigger transmitter 118 to transmit the message, e.g., to devices 140, 160 and/or 180.

In some demonstrative embodiments, device 102 may be configured to transmit the message during a DW.

In some demonstrative embodiments, device 102 may be configured to transmit the message in one or more further availability time slots, e.g., advertised according to the further availability map attribute, during which devices 140, 160 and/or 180 are to be awake.

In some demonstrative embodiments, device 140 may receive the message from device 102.

In some demonstrative embodiments, controller 154 may be configured to control, cause and/or trigger receiver 146 to process reception of the message from device 102.

In some demonstrative embodiments, controller 154 may be configured to control, cause and/or trigger message processor 158 to process, access, and/or decode the message from device 102.

In some demonstrative embodiments, device 140 may be configured to communicate data with device 102, for example, based on the message from device 102.

In some demonstrative embodiments, controller 154 may be configured to control, cause and/or trigger radio 144 to communicate data with device 102, for example, based on the message from device 102, e.g., as described below.

In some demonstrative embodiments, controller 154 may be configured to control, cause and/or trigger device 140 to negotiate one or more communication resources to communicate data with device 102 over the data path, for example, based on the message from device 102.

In one example, device 140 may receive from device 102 the message including a first plurality of communication resources to communicate data with device 102. Devices 102 and 140 may negotiate one or more communication resource to communicate between devices 102 and 140, for example, based on the first plurality of communication resources. Finally, devices 102 and 140 may agree on a second plurality of communication resources, e.g., based on the negotiation, and may communicate data using the second plurality of communication resources.

In some demonstrative embodiments, device 102 may utilize the message to indicate an availability mode of device 102 with respect to one or more wireless communication channels.

In some demonstrative embodiments, the plurality of communication resources may include a plurality of wireless communication channels.

In some demonstrative embodiments, the availability type indication with respect to a wireless communication channel may be configured to indicate the availability mode of device 102 to communicate data over the wireless communication channel.

For example, device 102 may prefer not to communicate data on a wireless communication channel. According to this example, device 102 may set the availability type indication to indicate, e.g., to device 140, that device 102 prefers not to communicate data using the communication resource.

In some demonstrative embodiments, the availability type indication may be configured to indicate the availability mode of device 102 to communicate data over two or more, e.g., all, channels of the plurality of wireless communication channels.

In some demonstrative embodiments, the indication of the plurality of communication resources may be in a form of a list or in the form of a bitmap, e.g., as described below.

In some demonstrative embodiments, the indication of the plurality of communication resources may include a list of channel numbers identifying the plurality of wireless communication channels corresponding to the indicated availability mode, e.g., as described below.

For example, the message may include an availability type indication to indicate device 102 is able to communicate data over one or more channels, and a list of channel numbers, in which device 102 is able to communicate the data.

In some demonstrative embodiments, the indication of the plurality of communication resources may include a channel bitmap corresponding to the availability type indication.

In one example, the indication of the plurality of communication resources may include a channel bitmap, for example, to reduce signaling overhead.

In some demonstrative embodiments, the channel bitmap may include a plurality of bits corresponding to the plurality of wireless communication channels. For example, a bit corresponding to a channel of the plurality of wireless communication channels may be configured to indicate the availability state of the NAN device to communicate data over the wireless communication channel, e.g., as described below.

For example, device 140 may determine that device 102 is unavailable to communicate data over a plurality of unavailable wireless communication channels, for example, if the availability type indication indicates that device 102 is unavailable to communicate data using the communication resource and the channel bitmap corresponding to the plurality of the unavailable wireless communication channels.

In some demonstrative embodiments, the channel bitmap may include at least two bytes, e.g., as described below.

In some demonstrative embodiments, the channel bitmap may include a bit set to a value to indicate whether or not the channel bitmap includes one or more additional bytes corresponding to additional wireless communication channels, e.g., as described below.

In some demonstrative embodiments, the message may include an operating class field to indicate a frequency band of the plurality of wireless communication channels, e.g., as described below.

In some demonstrative embodiments, the message, e.g., transmitted by device 102, may include time information with respect to a wireless communication channel of the plurality of wireless communication channels, e.g., as described below.

In some demonstrative embodiments, the message may include an availability bitmap corresponding to a channel of the plurality of wireless communication channels, the availability bitmap configured to indicate an availability of device 102 over the wireless communication channel during a plurality of time slots.

In some demonstrative embodiments, the availability bitmap may include a plurality of bits corresponding to the plurality of time slots, a bit corresponding to a time slot may indicate an availability of the NAN device to communicate data over the channel during the time slot.

In some demonstrative embodiments, the plurality of communication resources may include one or more time resources.

In some demonstrative embodiments, the message may include an indication of a plurality of time slots, and the availability type indication may be configured to indicate the availability mode of device 102 to communicate data during the plurality of time slots, e.g., as described below.

In some demonstrative embodiments, the indication of the plurality of time slots may include a bitmap including a plurality of bits corresponding to the plurality of time slots. For example, a bit corresponding to a time slot may indicate the availability mode, e.g., of device 102, to communicate data during the time slot, e.g., as described below.

In some demonstrative embodiments, device 102 may generate and/or transmit a message including one or more attributes, entries, and/or elements (IEs) to signal and/or to announce the indication of the plurality of the communication resources and/or the one or more availability type indications, e.g., as described below.

In some demonstrative embodiments, one or more elements of a signaling scheme, e.g., according to the NAN specification or any other specification, may be re-used, e.g., as described below.

In other embodiments, dedicated information elements and/or signaling elements may be used, e.g., as described below.

In some demonstrative embodiments, one or more elements of Table 1 and/or Table 2, may be reused, modified, and/or adjusted, for example, to signal the plurality of the communication resources and/or the one or more availability type indications.

In some demonstrative embodiments, a field, e.g., a first field, of an entry, e.g., the entry control field of the entry of Table 2, may be configured to indicate that the entry is being used to signal the plurality of the communication resources.

In some demonstrative embodiments, one or more reserved bits in the entry control field, e.g., the entry control field of Table 2, may be configured to indicate that the entry of Table 2 may be utilized to indicate the plurality of communication resources.

In some demonstrative embodiments, the plurality of communication resources may include the plurality of wireless communication channels and may be in the form of a list of channel numbers, e.g., as described below In one example, one bit, e.g., any bit in the reserved field of the entry control field of the entry of Table 2, may be used to indicate that the entry is utilized to indicate the plurality of communication resources, e.g., as follows:

TABLE 3

| Bit(s) | Information | Notes |
|---|---|---|
| 0-1 | Availability Interval Duration | Indicates the availability interval duration associated with the Availability Intervals Bitmap field. The value is set as follows: 0: 16 TU; 1: 32 TU; 2: 64 TU; 3: reserved |
| 2 | Indication of channel list | If bit is set to 0, then proceed as usual. If the bit is set to 1, then there are channel list following operating class |
| 3-7 | Reserved | — |

In some demonstrative embodiments, a field, e.g., a first field, of an entry, e.g., the entry control field of the entry of Table 2, may be configured to indicate that the entry is being used to signal the plurality of the communication resources and/or the one or more availability type indications.

In some demonstrative embodiments, multiple bits, e.g., multiple bits in the reserved field of the entry control field of Table 2, may be used to indicate different availability states; and/or one value, e.g., any other bit in the reserved field of the entry control field of Table 2, may be used, for example, to indicate the plurality of communication resources, e.g., as follows:

TABLE 4

| Bit(s) | Information | Notes |
|---|---|---|
| 0-1 | Availability Interval Duration | Indicates the availability interval duration associated with the Availability Intervals Bitmap field. The value is set as follows: 0: 16 TU; 1: 32 TU; 2: 64 TU; 3: reserved |
| TBD (for example, 3) | Indication of resource constraints | If field is set to 0, then proceed as usual. If the bit is set to 1, then there are list of channels following operating class. Other values can be used for other constraints. |
| TBD-7 | Reserved | — |

In some demonstrative embodiments, one or more other fields of the entry, e.g., other than the entry control field, may be configured to include the indication of the plurality of communication resources, e.g., including the list of channel numbers identifying the plurality of wireless communication channels, the operating class field and/or a number of the plurality of wireless communication channels.

In some demonstrative embodiments, an entry including the entry control field, the indication of the plurality of communication resources, the operating class field and the number of the plurality of wireless communication channels, may be constructed, e.g., as follows:

TABLE 5

| Field | Size (Octets) | Value (Hex) | Description |
|---|---|---|---|
| Entry Control | 1 | Variable | Availability Entry control information, as defined in Table 5-29. |
| Operating Class | 1 | Variable | Indicating the frequency band the NAN Device will be available as defined in [3] Annex E Table E-4 Global Operating Classes. |
| Length | 1 | variable | Indicating the number of listed channels, say 2 in this example |
| List of Channel Numbers | Length x 1 | Variable | Indicating the list of channel numbers that the NAN Device will be available. |

In some demonstrative embodiments, signaling, e.g., similar to the signaling of Tables 3, 4 and 5, may be used to signal the indication of the plurality of communication resources, for example, when the indication includes a channel bitmap corresponding to the plurality of communication resources.

In some demonstrative embodiments, a field, e.g., a first field, of an entry, e.g., the entry control field of the entry of Table 2, may be configured to indicate that the entry is being used to signal the plurality of the communication resources in the form of the channel bitmap.

In some demonstrative embodiments, one or more reserved bits in the entry control field, e.g., the entry control field of Table 2, may be configured to indicate that the entry of Table 2 may be utilized to indicate the wireless communication channels in the form of the channel bitmap.

In one example, one bit, e.g., any bit in the reserved field of the entry control field of the entry of Table 2, may be used to indicate that the entry is utilized to indicate the plurality of communication resources in the form of the channel bitmap, e.g., as follows:

TABLE 6

| Bit(s) | Information | Notes |
|---|---|---|
| 0-1 | Availability Interval Duration | Indicates the availability interval duration associated with the Availability Intervals Bitmap field. The value is set as follows: 0: 16 TU; 1: 32 TU; 2: 64 TU; 3: reserved |
| 2 | Indication of channel bitmap | If bit is set to 0, then proceed as usual. If the bit is set to 1, then there are channel bitmap following operating class |
| 3-7 | Reserved | — |

In some demonstrative embodiments, a field, e.g., a first field, of an entry, e.g., the entry control field of the entry of Table 2, may be configured to indicate that the entry is being used to signal the plurality of the communication resources and/or the one or more availability type indications.

In some demonstrative embodiments, multiple bits, e.g., multiple bits in the reserved field of the entry control field of Table 2, may be used to indicate different availability states; and/or one value, e.g., any other bit in the reserved field of the entry control field of Table 2, may be used, for example, to indicate the plurality of communication resources may be in the form of the channel bitmap, e.g., as follows:

TABLE 7

| Bit(s) | Information | Notes |
|---|---|---|
| 0-1 | Availability Interval Duration | Indicates the availability interval duration associated with the Availability Intervals Bitmap field. The value is set as follows: 0: 16 TU; 1: 32 TU; 2: 64 TU; 3: reserved |
| TBD (for example, 3) | Indication of resource constraints | If field is set to 0, then proceed as usual. If the bit is set to 1, then there are channel bitmap following operating class. Other values can be used for other constraints. |
| TBD-7 | Reserved | — |

In some demonstrative embodiments, one or more other fields of the entry, e.g., other than the entry control field, may be configured to include the indication of the plurality of communication resources, e.g., including the channel bitmap corresponding to the plurality of wireless communication channels, the operating class field, and/or a number of the plurality of wireless communication channels.

In some demonstrative embodiments, an entry including the entry control field, the indication of the plurality of communication resources, the operating class field and the number of the plurality of wireless communication channels, may be constructed, e.g., as described below.

In one example, the signaling of the channel bitmap may include, for example, a sequence of bits to signal the availability mode for the wireless communication channels, channels defined in the operating class, e.g., based on Annex E of the IEEE 802.11 Specification, or based on any other specification or protocol.

Figure 3:
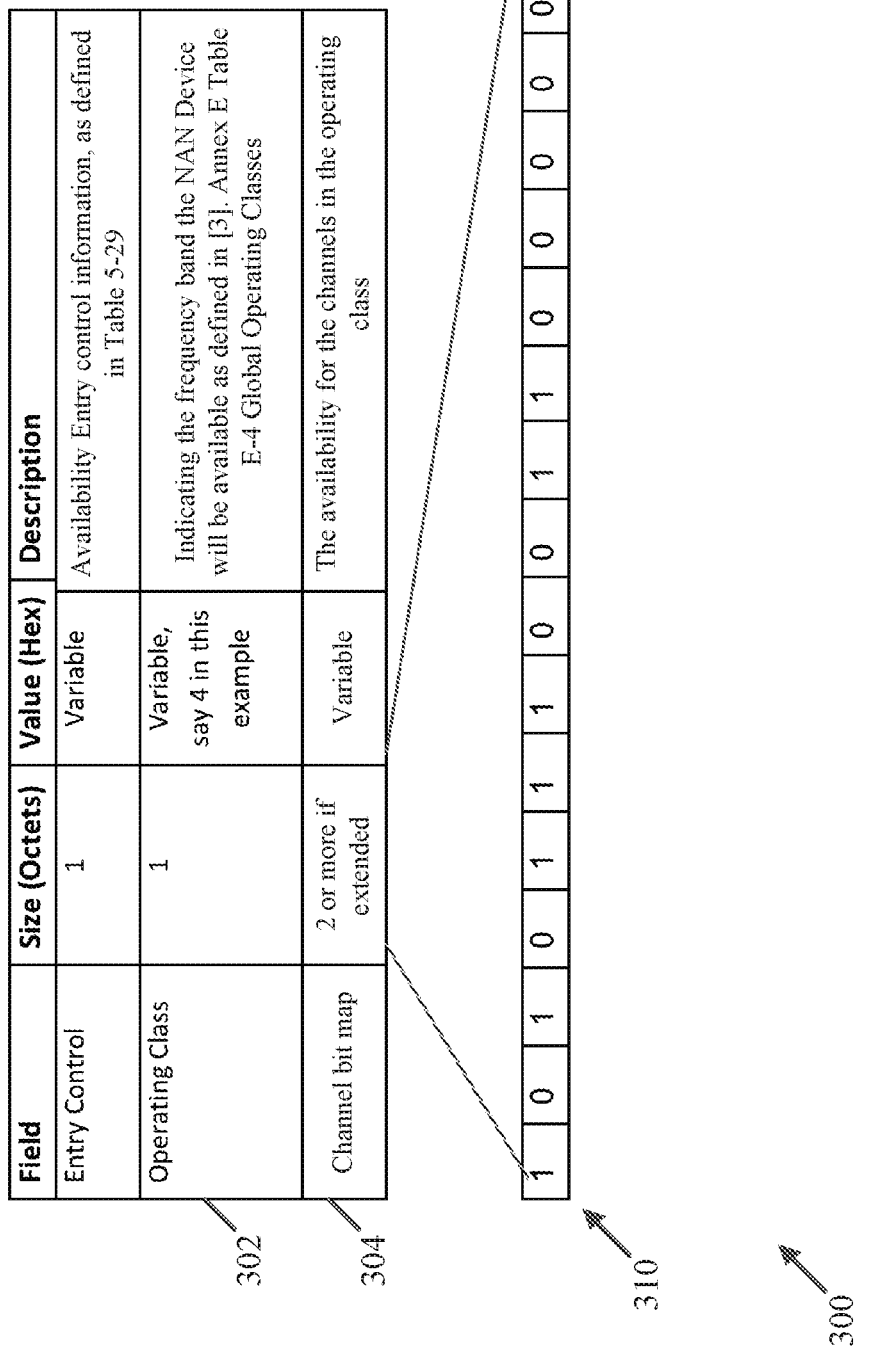
FIG. 3 is a schematic illustration of channel information including a channel bitmap, in accordance with some demonstrative embodiments.

Reference is made FIG. 3, which schematically illustrates an entry structure 300, in accordance with some demonstrative embodiments.

In some demonstrative embodiments, entry structure 300 may be transmitted by a NAN STA, e.g., device 102, 140, 160 and/or 180 (FIG. 1), to indicate a plurality of wireless communication channels in the form of a channel bitmap corresponding to the plurality of wireless communication channels.

As shown in FIG. 3, an operating class field 302 of entry structure 300 may include a value 4 to indicate the operating class may be in accordance with an operating class 4, which defines a channel set of 11 channels, e.g., the channels 100, 104, 108, 112, 116, 120, 124, 128, 132, 136, 140.

As shown in FIG. 3, a channel bitmap field 304 of entry structure 300 may include the indication of the channel set.

As shown in FIG. 3, the indication of the channel set may include a channel bitmap 310 including two Bytes.

As shown in FIG. 3, the first 11 bits in channel bitmap 310 may correspond to the set of 11 channels.

As shown in FIG. 3, the first 11 bits in channel bitmap 310 may indicate the availability of a NAN device transmitting the channel bitmap, e.g., during a time slot, with respect to the channels defined in operation class 4, e.g., the set of 11 channels.

In one example, according to the values of channel bitmap 310, the station may indicate that the availability mode may correspond to the channels 100, 108, 116, 120, 124, 136, and 140.

In some demonstrative embodiments, the number of bits in the channel bitmap indicating the availability may be different for each operation class, e.g., according to the number of channels defined for the operation class.

In some demonstrative embodiments, 2 bytes may be used, e.g., as shown in FIG. 3, for example, to cover operation classes having up to 16 channels. This size may be sufficient to cover the number of channels, which is no more than 16, as defined for each operation class in current specs.

In some demonstrative embodiments, any other number of bytes, for example, 3 bytes or any other larger number of bytes, may be used for the channel bitmap 310, e.g., as described below.

In some demonstrative embodiments, one or more bits of channel bitmap 310, which are not to be used for channel indication, may be, for example, reserved, e.g., for future extension.

In some demonstrative embodiments, a bit, for example, a last bit, e.g., bit 15, of the channel bitmap 310 may be used, for example, to indicate an additional extension.

For example, if the bit 15 is set to 1, then another predefined number of bytes, denoted x, may be used for channel indication, e.g., as described below with reference to FIG. 4.

Reference is made to FIG. 4, which schematically illustrates a channel bitmap 400, in accordance with some demonstrative embodiments.

For example, the channel bitmap of FIG. 4 may be transmitted by a NAN STA, e.g., device 102, 140, 160 and/or 180 (FIG. 1), to indicate the availability state of a plurality of wireless communication channels.

As shown in FIG. 4, the Bit 15 of the channel bitmap 400 may be set, for example, to "1", to indicate that a predefined number of x Bytes, e.g., x=1, is to be added to indicate the plurality of wireless communication channels. Accordingly, 3 Bytes or 24 bits may be configured to indicate the plurality of wireless communication channels, e.g., instead of 2 Bytes of channel bitmap 310 (FIG. 3).

For example, as shown in FIG. 4, the bit 15 may be set to the value "1" to indicate that an additional 1 Byte, e.g., 8 additional bits, may indicate up to 8 additional wireless communication channels.

Referring back to FIG. 1, in some demonstrative embodiments, one or more dedicated structures, IEs and/or entries may be configured to signal the plurality of the communication resources and/or the one or more availability type indications.

In some demonstrative embodiments, a dedicated general attribute may be configured to signal the plurality of the communication resources and/or the one or more availability type indications, for example, instead of the attribute of Table 1, e.g., as described below.

In some demonstrative embodiments, the dedicated attribute may include an attribute identifier, a length of the attribute, and a capability entry list field including a list of entries, e.g., as follows:

TABLE 8

| Field | size | value | description |
|---|---|---|---|
| Attribute ID | 1 | TBD | Identifies the type of NAN attribute. |
| Length | 2 | Variable | Length of the following fields in the attribute. |
| Capability Entry List | Variable | Variable | A list of Entry with capability indication such as channel and time. |

In some demonstrative embodiments, an entry of the list of entries of the capability entry list field of Table 8 may include an entry control field to indicate a type of information included in the entry and one or more other fields including the information e.g., as follows:

TABLE 9

| Field | Size (Octets) | Value (Hex) | Description |
|---|---|---|---|
| Entry Control | 1 | Variable | Indicate required information for the entry such as channel bitmap/channel list with certain type or time indication with certain type or time and channel indication with certain type |
| Other fields | | | |

In some demonstrative embodiments, a general attribute having a plurality of entries, e.g., 3 entries, may be constructed in accordance with Table 8 and Table 9, e.g., as follows:

TABLE 10

| Field | size | value | description |
|---|---|---|---|
| Attribute ID | 1 | TBD | Identifies the type of NAN attribute. |
| Length | 2 | Variable | Length of the following fields in the attribute. |
| Entry 1 | | | |
| Entry 2 | | | |
| Entry 3 | | | |

For example, Entries 1, 2, and 3, of Table 10 may be constructed, e.g., as described below with reference to Tables 11, 12 and 13.

In one example, the Entry 1 of Table 10 may include the following fields:

TABLE 11

| Entry Control | 1 | Variable | Indicate time and preferred channel 1 |
|---|---|---|---|
| Operating Class | 1 | Variable | Indicating the frequency band as defined in IEEE Std. 802.11-2012 [3]. Annex E Table E-4 Global Operating Classes. |
| Channel Number | 1 | Variable | Indicate the channel number |
| Time Intervals Bitmap | Variable | Variable | Indicate time slots |

In one example, the Entry 2 of Table 10 may include the following fields:

TABLE 12

| Entry Control | 1 | Variable | Indicate time and preferred channel 2 |
|---|---|---|---|
| Operating Class | 1 | Variable | Indicating the frequency band as defined in IEEE Std. 802.11-2012 [3]. Annex E Table E-4 Global Operating Classes. |
| Channel Number | 1 | Variable | Indicate the channel number |
| Time Intervals Bitmap | Variable | Variable | Indicate time slots |

In one example, the Entry 3 of Table 10 may include the following fields:

TABLE 13

| Entry Control | 1 | Variable | Indicate time and preferred channel 3 |
|---|---|---|---|
| Operating Class | 1 | Variable | Indicating the frequency band as defined in IEEE Std. 802.11-2012 [3]. Annex E Table E-4 Global Operating Classes. |
| Channel Number | 1 | Variable | Indicate the channel number |
| Time Intervals Bitmap | Variable | Variable | Indicate time slots |

In one example, the general attribute of Table 10 may be configured, for example, to signal three channels, and their respective availability modes. For example device 102 may configured an attribute according to Table 10 to signal a first channel having a first availability mode, e.g., an unavailable wireless communication channel, a second channel having a second availability mode, e.g., a preferable wireless communication channel, a third channel having a third availability mode, e.g., an available wireless communication channel; and three respective pluralities of time slots corresponding to the three channels.

According to this example, Entry 1 may include the operating class of the first channel and a plurality of time slots corresponding to the availability mode of the first channel, Entry 2 may include the operating class of the second channel and a plurality of time slots corresponding to the availability mode of the second channel, and/or Entry 3 may include the operating class of the third channel and a plurality of time slots corresponding to the availability mode of the third channel.

In another example, the general attribute of Table 10 may be configured to signal any combination of three availability type, e.g., including three different availability modes or any combination of different or identical availability modes, corresponding to three respective wireless communication channels.

In some demonstrative embodiments, one or more dedicated entries, e.g., corresponding to the general entry of Table 9, may be defined, e.g., as described below.

In some demonstrative embodiments, an entry including an indication of a wireless communication channel and an indication of a plurality of time slots may be defined, e.g., as follows:

TABLE 14

| Field | Size (Octets) | Value (Hex) | Description |
|---|---|---|---|
| Entry Control | 1 | Variable | Indicate time and channel entry with certain type such as preferred or unavailable or available. Duration of the time block is also indicated. Type of the time blocks can also be indicated. For example, the indicated time block is available or unavailable. |
| Operating Class | 1 | Variable | Indicating the frequency band as defined in IEEE Std. 802.11-2012 [3]. Annex E Table E-4 Global Operating Classes. |
| Channel Number | 1 | Variable | Indicate the channel number |
| Time Intervals Bitmap | Variable | Variable | The Time Intervals Bitmap divides the time between the beginnings of consecutive Discovery Windows of a given NAN cluster into consecutive time intervals of equal durations. The time interval duration is specified by the Availability Interval Duration indicated in Entry Control field. |

In some demonstrative embodiments, an entry including only an indication of time slots may be defined, e.g., as follows:

TABLE 15

| Field | Size (Octets) | Value (Hex) | Description |
|---|---|---|---|
| Entry Control | 1 | Variable | Indicate time entry with certain type such as preferred or unavailable or available. Duration of the time block is also indicated. |
| Time Intervals Bitmap | Variable | Variable | The Time Intervals Bitmap divides the time between the beginnings of consecutive Discovery Windows of a given NAN cluster into consecutive time intervals of equal durations. The time interval duration is specified by the Interval Duration indicated in Entry Control field. |

In one example, device 102 may be configured to transmit a message including an attribute with respect to seven channels. For example, the seven channels may include a first channel having a first availability mode, e.g., a first preferable channel, a second channel having a second availability mode, e.g., a second preferable channel, a third channel having a third availability mode, e.g., a third preferable channel, a fourth channel having a fourth availability mode, e.g., a first available channel, a fifth channel having a fifth availability mode, e.g., a second available channel, a sixth channel having a sixth availability mode, e.g., a third available channel, and a seventh channel having a seventh availability mode, e.g., a fourth available channel. the attribute may also include time slots for the seven channels, e.g., as follows:

TABLE 16

| Field | size | value | description |
|---|---|---|---|
| Attribute ID | 1 | TBD | Identifies the type of NAN attribute. |
| Length | 2 | Variable | Length of the following fields in the attribute. |
| Entry 1 | | | Entry for preferred channel 1 and time slots |
| Entry 2 | | | Entry for preferred channel 2 and time slots |
| Entry 3 | | | Entry for preferred channel 3 and time slots |
| Entry 4 | | | Entry for available channel 1 and time slots |
| Entry 5 | | | Entry for available channel 2 and time slots |
| Entry 6 | | | Entry for available channel 3 and time slots |
| Entry 7 | | | Entry for available channel 4 and time slots |

In one example, the attribute of Table 16 may include a first entry ("Entry F"), e.g., having a structure according to Table 14, to indicate the first preferable channel and its time slots; a second entry (Entry 2"), e.g., having a structure according to Table 14, to indicate the second preferable channel and its time slots; a third entry ("Entry 3"), e.g., having a structure according to Table 14, to indicate the third preferable channel and its time slots; a fourth entry ("Entry 4"), e.g., having a structure according to Table 14, to indicate the first available channel and its time slots; a fifth entry ("Entry 5"), e.g., having a structure according to Table 14, to indicate the second available channel and its time slots; a sixth entry ("Entry 6"), e.g., having a structure according to Table 14, to indicate the third available channel and its time slots; and seventh entry ("Entry 7"), e.g., having a structure according to Table 14, to indicate the fourth available channel and its time slots.

In some demonstrative embodiments, devices 102, 140, 160 and/or 180 may be configured to signal the plurality of communication resources and the one or more availability type information in one or more options, e.g., as described below.

In some demonstrative embodiments, embodiments, devices 102, 140, 160 and/or 180 may be configured to signal the plurality of communication resources using one or more combinations of messages, attributes, and/or entries, for example, using the attributes, structures, and/or entries of one or more of Tables 1-16.

For example, devices 102, 140, 160 and/or 180 may be configured to signal the plurality of communication resources and the one or more availability type indications according to one or more options, e.g., as described below.

In some demonstrative embodiments, a first option may include a single message including a single attribute and a plurality of respective entries corresponding to the plurality of wireless communication channels, e.g., as described above with reference to Table 10.

In some demonstrative embodiments, a second option may include a single message and a plurality of attributes, e.g., the attribute of Table 1 or Table 8, corresponding to respective ones of the plurality of wireless communication channels, each attribute having a single entry, e.g., the entry of Table 9 or Table 2.

In some demonstrative embodiments, a third option may include a plurality of messages corresponding to respective ones of the plurality of wireless communication channels, each message having a single attribute having a single entry, e.g., the attribute of Table 1.

Figure 5:
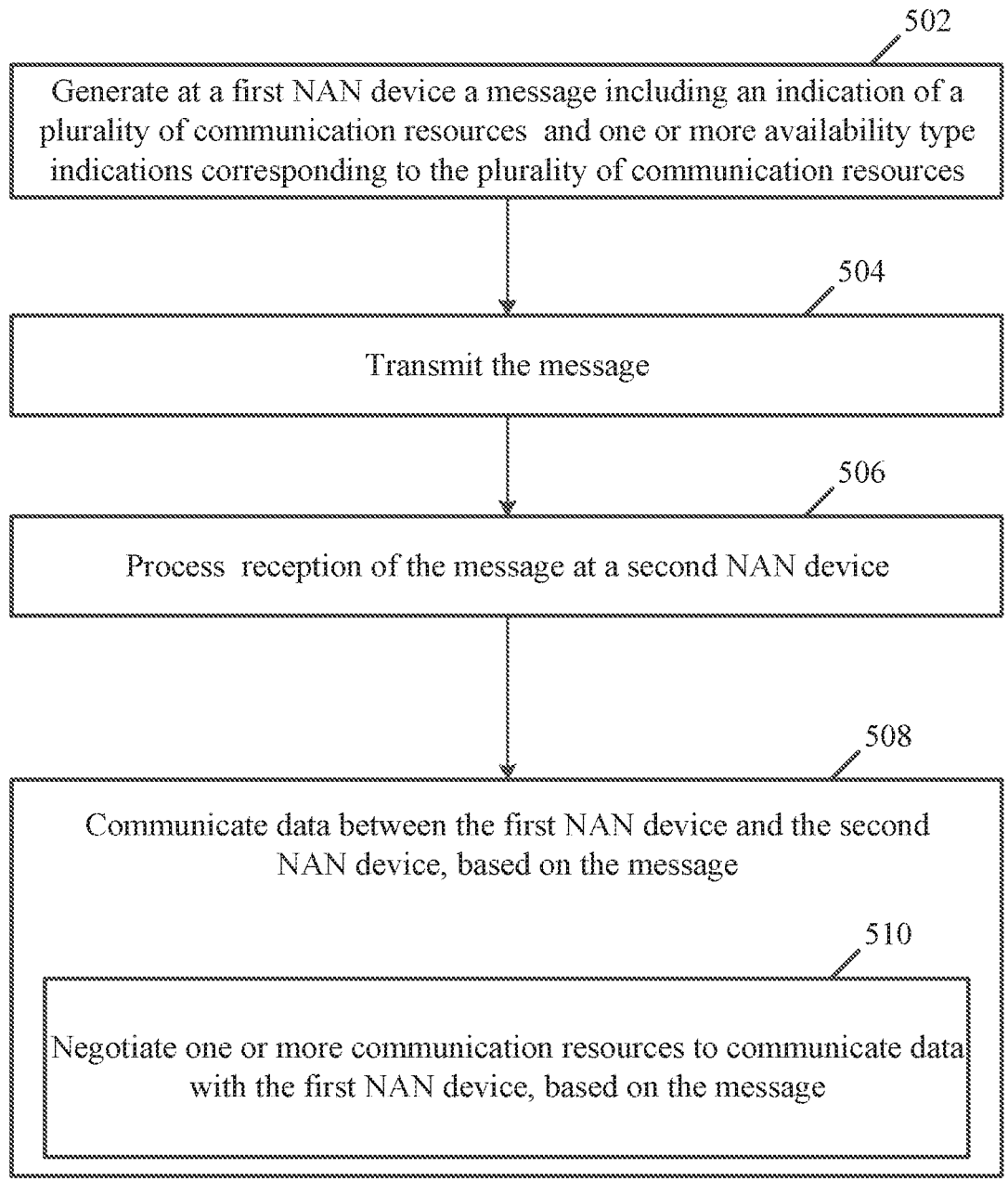
FIG. 5 is a schematic flow-chart illustration of a method of communicating over a data path group, in accordance with some demonstrative embodiments.

Reference is made to FIG. 5, which schematically illustrates a method of communicating over a data path, in accordance with some demonstrative embodiments. For example, one or more of the operations of the method of FIG. 5 may be performed by one or more elements of a system, e.g., system 100 (FIG. 1); a device, e.g., wireless communication devices 102, 140, 160 and/or 180 (FIG. 1); a controller, e.g., controller 124 (FIG. 1), and/or controller 154 (FIG. 1); a radio, e.g., radio 114 (FIG. 1), and/or radio 144 (FIG. 1); and/or a message processor, e.g., message processor 128 (FIG. 1) and/or message processor 158 (FIG. 1).

As indicated at block 502, the method may include generating at a first device a message including an indication of a plurality of communication resources and one or more availability type indications corresponding to the plurality of communication resources, an availability type indication corresponding to a communication resource is configured to indicate an availability mode of the NAN device to communicate data over a data path using the communication resource. For example, controller 124 (FIG. 1) may control, cause and/or trigger device 102 (FIG. 1) to generate the message including the indication of the plurality of communication resources and the one or more availability type indications, e.g., as described above.

As indicated at block 504, the method may include transmitting the message. For example, controller 124 (FIG. 1) may control, cause and/or trigger device 102 (FIG. 1) to transmit the message, e.g., as described above.

As indicated at block 506, the method may include processing reception of the message at a second NAN device. For example, controller 154 (FIG. 1) may control, cause and/or trigger device 140 (FIG. 1) to process reception of the message, e.g., as described above.

As indicated at block 508, the method may include communicating data with the first NAN device, based on the message. For example, controller 154 (FIG. 1) may control, cause and/or trigger device 140 (FIG. 1) to communicating data with device 102 (FIG. 1), for example, based on the message, e.g., as described above.

As indicated at block 510, communicating data with the first NAN device may include negotiating one or more communication resources to communicate data with the second NAN device over the data path, based on the message. For example, controller 154 (FIG. 1) may control, cause and/or trigger device 140 (FIG. 1) to negotiate one or more communication resources to communicate data with device 102 (FIG. 1) over the data path, for example, based on the message, e.g., as described above.

Figure 6:
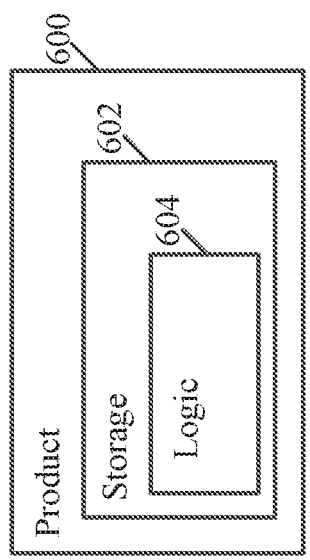
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), and/or to perform one or more operations and/or functionalities of the FIGS. 2, 3, 4, 5, and/or 6. The phrase "non-transitory machine-readable medium" is directed to include all computer-readable media, with the sole exception being a transitory propagating signal.

In some demonstrative embodiments, product 600 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a Neighbor Awareness Networking (NAN) device to generate a message comprising an indication of a plurality of communication resources and one or more availability type indications corresponding to the plurality of communication resources, an availability type indication corresponding to a communication resource is configured to indicate an availability mode of the NAN device to communicate data over a data path using the communication resource; and transmit the message.

Example 2 includes the subject matter of Example 1, and optionally, wherein the availability type indication is configured to indicate the NAN device is able to communicate the data using the communication resource, the NAN device is unavailable to communicate the data using the communication resource, the NAN device prefers to communicate the data using the communication resource, or the NAN device prefers not to communicate the data using the communication resource.

Example 3 includes the subject matter of Example 1 or 2, and optionally, wherein the plurality of communication resources comprises a plurality of wireless communication channels.

Example 4 includes the subject matter of Example 3, and optionally, wherein the availability type indication is configured to indicate the availability mode of the NAN device to communicate data over two or more wireless communication channels of the plurality of wireless communication channels.

Example 5 includes the subject matter of Example 3 or 4, and optionally, wherein the indication of the plurality of communication resources comprises a list of channel numbers identifying the plurality of wireless communication channels.

Example 6 includes the subject matter of any one of Examples 3-5, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the NAN device to communicate data over the wireless communication channel.

Example 7 includes the subject matter of Example 6, and optionally, wherein the channel bitmap comprises at least two bytes.

Example 8 includes the subject matter of Example 6 or 7, and optionally, wherein the channel bitmap comprises a bit set to a value to indicate whether or not the channel bitmap comprises one or more additional bytes corresponding to additional wireless communication channels.

Example 9 includes the subject matter of any one of Examples 3-8, and optionally, wherein the message comprises an operating class field to indicate a frequency band of the plurality of wireless communication channels.

Example 10 includes the subject matter of any one of Examples 3-9, and optionally, wherein the message comprises an availability bitmap corresponding to a wireless communication channel of the plurality of wireless communication channels, the availability bitmap configured to indicate the availability mode of the NAN device over the wireless communication channel during a plurality of time slots.

Example 11 includes the subject matter of Example 10, and optionally, wherein the availability bitmap comprises a plurality of bits corresponding to the plurality of time slots, a bit corresponding to a time slot indicates the availability mode of the NAN device to communicate data over the wireless communication channel during the time slot.

Example 12 includes the subject matter of any one of Examples 1-11, and optionally, wherein the plurality of communication resources comprises one or more time resources.

Example 13 includes the subject matter of Example 12, and optionally, wherein the message comprises an indication of a plurality of time slots, the availability type indication is configured to indicate the availability mode of the NAN device to communicate data during the plurality of time slots.

Example 14 includes the subject matter of Example 13, and optionally, wherein the indication of the plurality of time slots comprises a bitmap comprising a plurality of bits corresponding to the plurality of time slots, a bit corresponding to a time slot indicates the availability mode of the NAN device to communicate data during the time slot.

Example 15 includes the subject matter of any one of Examples 1-14, and optionally, wherein the availability type indication is configured to indicate the availability mode of the NAN device with respect to two or more communication resources of the plurality of communication resources.

Example 16 includes the subject matter of any one of Examples 1-15, and optionally, comprising one or more antennas, a memory, and a processor.

Example 17 includes a system of wireless communication comprising a Neighbor Awareness Networking (NAN) device, the NAN device comprising one or more antennas; a memory; a processor; and a controller comprising logic and circuitry configured to cause the NAN device to generate a message comprising an indication of a plurality of communication resources and one or more availability type indications corresponding to the plurality of communication resources, an availability type indication corresponding to a communication resource is configured to indicate an availability mode of the NAN device to communicate data over a data path using the communication resource, the controller to cause the NAN device to transmit the message.

Example 18 includes the subject matter of Example 17, and optionally, wherein the availability type indication is configured to indicate the NAN device is able to communicate the data using the communication resource, the NAN device is unavailable to communicate the data using the communication resource, the NAN device prefers to communicate the data using the communication resource, or the NAN device prefers not to communicate the data using the communication resource.

Example 19 includes the subject matter of Example 17 or 18, and optionally, wherein the plurality of communication resources comprises a plurality of wireless communication channels.

Example 20 includes the subject matter of Example 19, and optionally, wherein the availability type indication is configured to indicate the availability mode of the NAN device to communicate data over two or more wireless communication channels of the plurality of wireless communication channels.

Example 21 includes the subject matter of Example 19 or 20, and optionally, wherein the indication of the plurality of communication resources comprises a list of channel numbers identifying the plurality of wireless communication channels.

Example 22 includes the subject matter of any one of Examples 19-21, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the NAN device to communicate data over the wireless communication channel.

Example 23 includes the subject matter of Example 22, and optionally, wherein the channel bitmap comprises at least two bytes.

Example 24 includes the subject matter of Example 22 or 23, and optionally, wherein the channel bitmap comprises a bit set to a value to indicate whether or not the channel bitmap comprises one or more additional bytes corresponding to additional wireless communication channels.

Example 25 includes the subject matter of any one of Examples 19-24, and optionally, wherein the message comprises an operating class field to indicate a frequency band of the plurality of wireless communication channels.

Example 26 includes the subject matter of any one of Examples 19-25, and optionally, wherein the message comprises an availability bitmap corresponding to a wireless communication channel of the plurality of wireless communication channels, the availability bitmap configured to indicate the availability mode of the NAN device over the wireless communication channel during a plurality of time slots.

Example 27 includes the subject matter of Example 26, and optionally, wherein the availability bitmap comprises a plurality of bits corresponding to the plurality of time slots, a bit corresponding to a time slot indicates the availability mode of the NAN device to communicate data over the wireless communication channel during the time slot.

Example 28 includes the subject matter of any one of Examples 17-27, and optionally, wherein the plurality of communication resources comprises one or more time resources.

Example 29 includes the subject matter of Example 28, and optionally, wherein the message comprises an indication of a plurality of time slots, the availability type indication is configured to indicate the availability mode of the NAN device to communicate data during the plurality of time slots.

Example 30 includes the subject matter of Example 29, and optionally, wherein the indication of the plurality of time slots comprises a bitmap comprising a plurality of bits corresponding to the plurality of time slots, a bit corresponding to a time slot indicates the availability mode of the NAN device to communicate data during the time slot.

Example 31 includes the subject matter of any one of Examples 17-30, and optionally, wherein the availability type indication is configured to indicate the availability mode of the NAN device with respect to two or more communication resources of the plurality of communication resources.

Example 32 includes a method to be performed at a Neighbor Awareness Networking (NAN) device, the method comprising generating a message comprising an indication of a plurality of communication resources and one or more availability type indications corresponding to the plurality of communication resources, an availability type indication corresponding to a communication resource is configured to indicate an availability mode of the NAN device to communicate data over a data path using the communication resource; and transmitting the message.

Example 33 includes the subject matter of Example 32, and optionally, wherein the availability type indication is configured to indicate the NAN device is able to communicate the data using the communication resource, the NAN device is unavailable to communicate the data using the communication resource, the NAN device prefers to communicate the data using the communication resource, or the NAN device prefers not to communicate the data using the communication resource.

Example 34 includes the subject matter of Example 32 or 33, and optionally, wherein the plurality of communication resources comprises a plurality of wireless communication channels.

Example 35 includes the subject matter of Example 34, and optionally, wherein the availability type indication is configured to indicate the availability mode of the NAN device to communicate data over two or more wireless communication channels of the plurality of wireless communication channels.

Example 36 includes the subject matter of Example 34 or 35, and optionally, wherein the indication of the plurality of communication resources comprises a list of channel numbers identifying the plurality of wireless communication channels.

Example 37 includes the subject matter of any one of Examples 34-36, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the NAN device to communicate data over the wireless communication channel.

Example 38 includes the subject matter of Example 37, and optionally, wherein the channel bitmap comprises at least two bytes.

Example 39 includes the subject matter of Example 37 or 38, and optionally, wherein the channel bitmap comprises a bit set to a value to indicate whether or not the channel bitmap comprises one or more additional bytes corresponding to additional wireless communication channels.

Example 40 includes the subject matter of any one of Examples 34-39, and optionally, wherein the message comprises an operating class field to indicate a frequency band of the plurality of wireless communication channels.

Example 41 includes the subject matter of any one of Examples 34-40, and optionally, wherein the message comprises an availability bitmap corresponding to a wireless communication channel of the plurality of wireless communication channels, the availability bitmap configured to indicate the availability mode of the NAN device over the wireless communication channel during a plurality of time slots.

Example 42 includes the subject matter of Example 41, and optionally, wherein the availability bitmap comprises a plurality of bits corresponding to the plurality of time slots, a bit corresponding to a time slot indicates the availability mode of the NAN device to communicate data over the wireless communication channel during the time slot.

Example 43 includes the subject matter of any one of Examples 32-42, and optionally, wherein the plurality of communication resources comprises one or more time resources.

Example 44 includes the subject matter of Example 43, and optionally, wherein the message comprises an indication of a plurality of time slots, the availability type indication is configured to indicate the availability mode of the NAN device to communicate data during the plurality of time slots.

Example 45 includes the subject matter of Example 44, and optionally, wherein the indication of the plurality of time slots comprises a bitmap comprising a plurality of bits corresponding to the plurality of time slots, a bit corresponding to a time slot indicates the availability mode of the NAN device to communicate data during the time slot.

Example 46 includes the subject matter of any one of Examples 32-45, and optionally, wherein the availability type indication is configured to indicate the availability mode of the NAN device with respect to two or more communication resources of the plurality of communication resources.

Example 47 includes a product comprising one or more tangible computer-readable non-transitory storage media comprising computer-executable instructions operable to, when executed by at least one computer processor, enable the at least one computer processor to implement one or more operations at a Neighbor Awareness Networking (NAN) device, the operations comprising generating a message comprising an indication of a plurality of communication resources and one or more availability type indications corresponding to the plurality of communication resources, an availability type indication corresponding to a communication resource is configured to indicate an availability mode of the NAN device to be available to communicate data over a data path using the communication resource; and transmitting the message.

Example 48 includes the subject matter of Example 47, and optionally, wherein the availability type indication is configured to indicate the NAN device is able to communicate the data using the communication resource, the NAN device is unavailable to communicate the data using the communication resource, the NAN device prefers to communicate the data using the communication resource, or the NAN device prefers not to communicate the data using the communication resource.

Example 49 includes the subject matter of Example 47 or 48, and optionally, wherein the plurality of communication resources comprises a plurality of wireless communication channels.

Example 50 includes the subject matter of Example 49, and optionally, wherein the availability type indication is configured to indicate the availability mode of the NAN device to communicate data over two or more wireless communication channels of the plurality of wireless communication channels.

Example 51 includes the subject matter of Example 49 or 50, and optionally, wherein the indication of the plurality of communication resources comprises a list of channel numbers identifying the plurality of wireless communication channels.

Example 52 includes the subject matter of any one of Examples 49-51, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the NAN device to communicate data over the wireless communication channel.

Example 53 includes the subject matter of Example 52, and optionally, wherein the channel bitmap comprises at least two bytes.

Example 54 includes the subject matter of Example 52 or 53, and optionally, wherein the channel bitmap comprises a bit set to a value to indicate whether or not the channel bitmap comprises one or more additional bytes corresponding to additional wireless communication channels.

Example 55 includes the subject matter of any one of Examples 49-54, and optionally, wherein the message comprises an operating class field to indicate a frequency band of the plurality of wireless communication channels.

Example 56 includes the subject matter of any one of Examples 49-55, and optionally, wherein the message comprises an availability bitmap corresponding to a wireless communication channel of the plurality of wireless communication channels, the availability bitmap configured to indicate the availability mode of the NAN device over the wireless communication channel during a plurality of time slots.

Example 57 includes the subject matter of Example 56, and optionally, wherein the availability bitmap comprises a plurality of bits corresponding to the plurality of time slots, a bit corresponding to a time slot indicates the availability mode of the NAN device to communicate data over the wireless communication channel during the time slot.

Example 58 includes the subject matter of any one of Examples 47-57, and optionally, wherein the plurality of communication resources comprises one or more time resources.

Example 59 includes the subject matter of Example 58, and optionally, wherein the message comprises an indication of a plurality of time slots, the availability type indication is configured to indicate the availability mode of the NAN device to communicate data during the plurality of time slots.

Example 60 includes the subject matter of Example 59, and optionally, wherein the indication of the plurality of time slots comprises a bitmap comprising a plurality of bits corresponding to the plurality of time slots, a bit corresponding to a time slot indicates the availability mode of the NAN device to communicate data during the time slot.

Example 61 includes the subject matter of any one of Examples 47-60, and optionally, wherein the availability type indication is configured to indicate the availability mode of the NAN device with respect to two or more communication resources of the plurality of communication resources.

Example 62 includes an apparatus of wireless communication comprising a Neighbor Awareness Networking (NAN) device, the apparatus comprising means for generating a message comprising an indication of a plurality of communication resources and one or more availability type indications corresponding to the plurality of communication resources, an availability type indication corresponding to a communication resource is configured to indicate an availability mode of the NAN device to communicate data over a data path using the communication resource; and means for transmitting the message.

Example 63 includes the subject matter of Example 62, and optionally, wherein the availability type indication is configured to indicate the NAN device is able to communicate the data using the communication resource, the NAN device is unavailable to communicate the data using the communication resource, the NAN device prefers to communicate the data using the communication resource, or the NAN device prefers not to communicate the data using the communication resource.

Example 64 includes the subject matter of Example 62 or 63, and optionally, wherein the plurality of communication resources comprises a plurality of wireless communication channels.

Example 65 includes the subject matter of Example 64, and optionally, wherein the availability type indication is configured to indicate the availability mode of the NAN device to communicate data over two or more wireless communication channels of the plurality of wireless communication channels.

Example 66 includes the subject matter of Example 64 or 65, and optionally, wherein the indication of the plurality of communication resources comprises a list of channel numbers identifying the plurality of wireless communication channels.

Example 67 includes the subject matter of any one of Examples 64-66, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the NAN device to communicate data over the wireless communication channel.

Example 68 includes the subject matter of Example 67, and optionally, wherein the channel bitmap comprises at least two bytes.

Example 69 includes the subject matter of Example 67 or 68, and optionally, wherein the channel bitmap comprises a bit set to a value to indicate whether or not the channel bitmap comprises one or more additional bytes corresponding to additional wireless communication channels.

Example 70 includes the subject matter of any one of Examples 64-69, and optionally, wherein the message comprises an operating class field to indicate a frequency band of the plurality of wireless communication channels.

Example 71 includes the subject matter of any one of Examples 64-70, and optionally, wherein the message comprises an availability bitmap corresponding to a wireless communication channel of the plurality of wireless communication channels, the availability bitmap configured to indicate the availability mode of the NAN device over the wireless communication channel during a plurality of time slots.

Example 72 includes the subject matter of Example 71, and optionally, wherein the availability bitmap comprises a plurality of bits corresponding to the plurality of time slots, a bit corresponding to a time slot indicates the availability mode of the NAN device to communicate data over the wireless communication channel during the time slot.

Example 73 includes the subject matter of any one of Examples 62-72, and optionally, wherein the plurality of communication resources comprises one or more time resources.

Example 74 includes the subject matter of Example 73, and optionally, wherein the message comprises an indication of a plurality of time slots, the availability type indication is configured to indicate the availability mode of the NAN device to communicate data during the plurality of time slots.

Example 75 includes the subject matter of Example 74, and optionally, wherein the indication of the plurality of time slots comprises a bitmap comprising a plurality of bits corresponding to the plurality of time slots, a bit corresponding to a time slot indicates the availability mode of the NAN device to communicate data during the time slot.

Example 76 includes the subject matter of any one of Examples 62-75, and optionally, wherein the availability type indication is configured to indicate the availability mode of the NAN device with respect to two or more communication resources of the plurality of communication resources.

Example 77 includes an apparatus comprising logic and circuitry configured to cause a first Neighbor Awareness Networking (NAN) device to process reception of a message from a second NAN device, the message comprising an indication of a plurality of communication resources and one or more availability type indications corresponding to the plurality of communication resources, an availability type indication corresponding to a communication resource is configured to indicate an availability mode of the second NAN device to communicate data with the first NAN device over a data path using the communication resource; and communicate data with the second NAN device, based on the message.

Example 78 includes the subject matter of Example 77, and optionally, wherein the apparatus is configured to cause the first NAN device to negotiate, based on the message, one or more communication resources to communicate data with the second NAN device over the data path.

Example 79 includes the subject matter of Example 77 or 78, and optionally, wherein the availability type indication is configured to indicate the second NAN device is able to communicate the data using the communication resource, the second NAN device is unavailable to communicate the data using the communication resource, the second NAN device prefers to communicate the data using the communication resource, or the second NAN device prefers not to communicate the data using the communication resource.

Example 80 includes the subject matter of any one of Examples 77-79, and optionally, wherein the plurality of communication resources comprises a plurality of wireless communication channels.

Example 81 includes the subject matter of Example 80, and optionally, wherein the availability type indication is configured to indicate the availability mode of the second NAN device to communicate data over two or more channels of the plurality of wireless communication channels.

Example 82 includes the subject matter of Example 80 or 81, and optionally, wherein the indication of the plurality of communication resources comprises a list of channel numbers identifying the plurality of wireless communication channels.

Example 83 includes the subject matter of any one of Examples 80-82, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the second NAN device to communicate data over the wireless communication channel.

Example 84 includes the subject matter of Example 83, and optionally, wherein the channel bitmap comprises at least two bytes.

Example 85 includes the subject matter of Example 83 or 84, and optionally, wherein the channel bitmap comprises a bit set to a value to indicate whether or not the channel bitmap comprises one or more additional bytes corresponding to additional channels.

Example 86 includes the subject matter of any one of Examples 80-85, and optionally, wherein the message comprises an operating class field to indicate a frequency band of the plurality of wireless communication channels.

Example 87 includes the subject matter of any one of Examples 80-86, and optionally, wherein the message comprises an availability bitmap corresponding to a wireless communication channel of the plurality of wireless communication channels, the availability bitmap configured to indicate the availability mode of the second NAN device over the wireless communication channel during a plurality of time slots.

Example 88 includes the subject matter of Example 87, and optionally, wherein the availability bitmap comprises a plurality of bits corresponding to the plurality of time slots, a bit corresponding to a time slot indicates the availability mode of the second NAN device to communicate data over the wireless communication channel during the time slot.

Example 89 includes the subject matter of any one of Examples 77-88, and optionally, wherein the plurality of communication resources comprises one or more time resources.

Example 90 includes the subject matter of Example 89, and optionally, wherein the message comprises an indication of a plurality of time slots, the availability type indication is configured to indicate a capability of the second NAN device to be available to communicate data during the plurality of time slots.

Example 91 includes the subject matter of Example 90, and optionally, wherein the indication of the plurality of time slots comprises a bitmap comprising a plurality of bits corresponding to the plurality of time slots, a bit corresponding to a time slot indicates the capability of the second NAN device to be available to communicate data during the time slot.

Example 92 includes the subject matter of any one of Examples 77-91, and optionally, wherein the availability type indication is configured to indicate the availability mode of the second NAN device with respect to two or more communication resources of the plurality of communication resources.

Example 93 includes the subject matter of any one of Examples 77-92, and optionally, comprising one or more antennas, a memory, and a processor.

Example 94 includes a system of wireless communication comprising a first Neighbor Awareness Networking (NAN) device, the first NAN device comprising one or more antennas; a memory; a processor; and a controller comprising logic and circuitry configured to cause the first NAN device to process reception of a message from a second NAN device, the message comprising an indication of a plurality of communication resources and one or more availability type indications corresponding to the plurality of communication resources, an availability type indication corresponding to a communication resource is configured to indicate an availability mode of the second NAN device to communicate data with the first NAN device over a data path using the communication resource, the controller to cause the first NAN device to communicate data with the second NAN device, based on the message.

Example 95 includes the subject matter of Example 94, and optionally, wherein the first NAN device is configured to negotiate, based on the message, one or more communication resources to communicate data with the second NAN device over the data path.

Example 96 includes the subject matter of Example 94 or 95, and optionally, wherein the availability type indication is configured to indicate the second NAN device is able to communicate the data using the communication resource, the second NAN device is unavailable to communicate the data using the communication resource, the second NAN device prefers to communicate the data using the communication resource, or the second NAN device prefers not to communicate the data using the communication resource.

Example 97 includes the subject matter of any one of Examples 94-96, and optionally, wherein the plurality of communication resources comprises a plurality of wireless communication channels.

Example 98 includes the subject matter of Example 97, and optionally, wherein the availability type indication is configured to indicate the availability mode of the second NAN device to communicate data over two or more channels of the plurality of wireless communication channels.

Example 99 includes the subject matter of Example 97 or 98, and optionally, wherein the indication of the plurality of communication resources comprises a list of channel numbers identifying the plurality of wireless communication channels.

Example 100 includes the subject matter of any one of Examples 97-99, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the second NAN device to communicate data over the wireless communication channel.

Example 101 includes the subject matter of Example 100, and optionally, wherein the channel bitmap comprises at least two bytes.

Example 102 includes the subject matter of Example 100 or 101, and optionally, wherein the channel bitmap comprises a bit set to a value to indicate whether or not the channel bitmap comprises one or more additional bytes corresponding to additional channels.

Example 103 includes the subject matter of any one of Examples 97-102, and optionally, wherein the message comprises an operating class field to indicate a frequency band of the plurality of wireless communication channels.

Example 104 includes the subject matter of any one of Examples 97-103, and optionally, wherein the message comprises an availability bitmap corresponding to a wireless communication channel of the plurality of wireless communication channels, the availability bitmap configured to indicate the availability mode of the second NAN device over the wireless communication channel during a plurality of time slots.

Example 105 includes the subject matter of Example 104, and optionally, wherein the availability bitmap comprises a plurality of bits corresponding to the plurality of time slots, a bit corresponding to a time slot indicates the availability mode of the second NAN device to communicate data over the wireless communication channel during the time slot.

Example 106 includes the subject matter of any one of Examples 94-105, and optionally, wherein the plurality of communication resources comprises one or more time resources.

Example 107 includes the subject matter of Example 106, and optionally, wherein the message comprises an indication of a plurality of time slots, the availability type indication is configured to indicate a capability of the second NAN device to be available to communicate data during the plurality of time slots.

Example 108 includes the subject matter of Example 107, and optionally, wherein the indication of the plurality of time slots comprises a bitmap comprising a plurality of bits corresponding to the plurality of time slots, a bit corresponding to a time slot indicates the capability of the second NAN device to be available to communicate data during the time slot.

Example 109 includes the subject matter of any one of Examples 94-108, and optionally, wherein the availability type indication is configured to indicate the availability mode of the second NAN device with respect to two or more communication resources of the plurality of communication resources.

Example 110 includes a method to be performed at a first Neighbor Awareness Networking (NAN) device, the method comprising processing reception of a message from a second NAN device, the message comprising an indication of a plurality of communication resources and one or more availability type indications corresponding to the plurality of communication resources, an availability type indication corresponding to a communication resource is configured to indicate availability mode of the second NAN device to communicate data with the first NAN device over a data path using the communication resource; and communicating data with the second NAN device, based on the message.

Example 111 includes the subject matter of Example 110, and optionally, comprising negotiating, based on the message, one or more communication resources to communicate data with the second NAN device over the data path.

Example 112 includes the subject matter of Example 110 or 111, and optionally, wherein the availability type indication is configured to indicate the second NAN device is able to communicate the data using the communication resource, the second NAN device is unavailable to communicate the data using the communication resource, the second NAN device prefers to communicate the data using the communication resource, or the second NAN device prefers not to communicate the data using the communication resource.

Example 113 includes the subject matter of any one of Examples 110-112, and optionally, wherein the plurality of communication resources comprises a plurality of wireless communication channels.

Example 114 includes the subject matter of Example 113, and optionally, wherein the availability type indication is configured to indicate the availability mode of the second NAN device to communicate data over two or more channels of the plurality of wireless communication channels.

Example 115 includes the subject matter of Example 113 or 114, and optionally, wherein the indication of the plurality of communication resources comprises a list of channel numbers identifying the plurality of wireless communication channels.

Example 116 includes the subject matter of any one of Examples 113-115, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the second NAN device to communicate data over the wireless communication channel.

Example 117 includes the subject matter of Example 116, and optionally, wherein the channel bitmap comprises at least two bytes.

Example 118 includes the subject matter of Example 116 or 117, and optionally, wherein the channel bitmap comprises a bit set to a value to indicate whether or not the channel bitmap comprises one or more additional bytes corresponding to additional channels.

Example 119 includes the subject matter of any one of Examples 113-118, and optionally, wherein the message comprises an operating class field to indicate a frequency band of the plurality of wireless communication channels.

Example 120 includes the subject matter of any one of Examples 113-119, and optionally, wherein the message comprises an availability bitmap corresponding to a wireless communication channel of the plurality of wireless communication channels, the availability bitmap configured to indicate the availability mode of the second NAN device over the wireless communication channel during a plurality of time slots.

Example 121 includes the subject matter of Example 120, and optionally, wherein the availability bitmap comprises a plurality of bits corresponding to the plurality of time slots, a bit corresponding to a time slot indicates the availability mode of the second NAN device to communicate data over the wireless communication channel during the time slot.

Example 122 includes the subject matter of any one of Examples 110-121, and optionally, wherein the plurality of communication resources comprises one or more time resources.

Example 123 includes the subject matter of Example 122, and optionally, wherein the message comprises an indication of a plurality of time slots, the availability type indication is configured to indicate a capability of the second NAN device to be available to communicate data during the plurality of time slots.

Example 124 includes the subject matter of Example 123, and optionally, wherein the indication of the plurality of time slots comprises a bitmap comprising a plurality of bits corresponding to the plurality of time slots, a bit corresponding to a time slot indicates the capability of the second NAN device to be available to communicate data during the time slot.

Example 125 includes the subject matter of any one of Examples 110-124, and optionally, wherein the availability type indication is configured to indicate the availability mode of the second NAN device with respect to two or more communication resources of the plurality of communication resources.

Example 126 includes a product comprising one or more tangible computer-readable non-transitory storage media comprising computer-executable instructions operable to, when executed by at least one computer processor, enable the at least one computer processor to implement one or more operations at a first Neighbor Awareness Networking (NAN) device, the operations comprising processing reception of a message from a second NAN device, the message comprising an indication of a plurality of communication resources and one or more availability type indications corresponding to the plurality of communication resources, an availability type indication corresponding to a communication resource is configured to indicate availability mode of the second NAN device to communicate data with the first NAN device over a data path using the communication resource; and communicating data with the second NAN device, based on the message.

Example 127 includes the subject matter of Example 126, and optionally, wherein the operations comprise negotiating, based on the message, one or more communication resources to communicate data with the second NAN device over the data path.

Example 128 includes the subject matter of Example 126 or 127, and optionally, wherein the availability type indication is configured to indicate the second NAN device is able to communicate the data using the communication resource, the second NAN device is unavailable to communicate the data using the communication resource, the second NAN device prefers to communicate the data using the communication resource, or the second NAN device prefers not to communicate the data using the communication resource.

Example 129 includes the subject matter of any one of Examples 126-128, and optionally, wherein the plurality of communication resources comprises a plurality of wireless communication channels.

Example 130 includes the subject matter of Example 129, and optionally, wherein the availability type indication is configured to indicate the availability mode of the second NAN device to communicate data over two or more channels of the plurality of wireless communication channels.

Example 131 includes the subject matter of Example 129 or 130, and optionally, wherein the indication of the plurality of communication resources comprises a list of channel numbers identifying the plurality of wireless communication channels.

Example 132 includes the subject matter of any one of Examples 129-131, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the second NAN device to communicate data over the wireless communication channel.

Example 133 includes the subject matter of Example 132, and optionally, wherein the channel bitmap comprises at least two bytes.

Example 134 includes the subject matter of Example 132 or 133, and optionally, wherein the channel bitmap comprises a bit set to a value to indicate whether or not the channel bitmap comprises one or more additional bytes corresponding to additional channels.

Example 135 includes the subject matter of any one of Examples 129-134, and optionally, wherein the message comprises an operating class field to indicate a frequency band of the plurality of wireless communication channels.

Example 136 includes the subject matter of any one of Examples 129-135, and optionally, wherein the message comprises an availability bitmap corresponding to a wireless communication channel of the plurality of wireless communication channels, the availability bitmap configured to indicate the availability mode of the second NAN device over the wireless communication channel during a plurality of time slots.

Example 137 includes the subject matter of Example 136, and optionally, wherein the availability bitmap comprises a plurality of bits corresponding to the plurality of time slots, a bit corresponding to a time slot indicates the availability mode of the second NAN device to communicate data over the wireless communication channel during the time slot.

Example 138 includes the subject matter of any one of Examples 126-137, and optionally, wherein the plurality of communication resources comprises one or more time resources.

Example 139 includes the subject matter of Example 138, and optionally, wherein the message comprises an indication of a plurality of time slots, the availability type indication is configured to indicate a capability of the second NAN device to be available to communicate data during the plurality of time slots.

Example 140 includes the subject matter of Example 139, and optionally, wherein the indication of the plurality of time slots comprises a bitmap comprising a plurality of bits corresponding to the plurality of time slots, a bit corresponding to a time slot indicates the capability of the second NAN device to be available to communicate data during the time slot.

Example 141 includes the subject matter of any one of Examples 126-140, and optionally, wherein the availability type indication is configured to indicate the availability mode of the second NAN device with respect to two or more communication resources of the plurality of communication resources.

Example 142 includes an apparatus of wireless communication comprising a first Neighbor Awareness Networking (NAN) device, the apparatus comprising means for processing reception of a message from a second NAN device, the message comprising an indication of a plurality of communication resources and one or more availability type indications corresponding to the plurality of communication resources, an availability type indication corresponding to a communication resource is configured to indicate availability mode of the second NAN device to communicate data with the first NAN device over a data path using the communication resource; and means for communicating data with the second NAN device, based on the message.

Example 143 includes the subject matter of Example 142, and optionally, comprising means for negotiating, based on the message, one or more communication resources to communicate data with the second NAN device over the data path.

Example 144 includes the subject matter of Example 142 or 143, and optionally, wherein the availability type indication is configured to indicate the second NAN device is able to communicate the data using the communication resource, the second NAN device is unavailable to communicate the data using the communication resource, the second NAN device prefers to communicate the data using the communication resource, or the second NAN device prefers not to communicate the data using the communication resource.

Example 145 includes the subject matter of any one of Examples 142-144, and optionally, wherein the plurality of communication resources comprises a plurality of wireless communication channels.

Example 146 includes the subject matter of Example 145, and optionally, wherein the availability type indication is configured to indicate the availability mode of the second NAN device to communicate data over two or more channels of the plurality of wireless communication channels.

Example 147 includes the subject matter of Example 145 or 146, and optionally, wherein the indication of the plurality of communication resources comprises a list of channel numbers identifying the plurality of wireless communication channels.

Example 148 includes the subject matter of any one of Examples 145-147, and optionally, wherein the indication of the plurality of communication resources comprises a channel bitmap corresponding to the availability type indication, the channel bitmap comprising a plurality of bits corresponding to the plurality of wireless communication channels, a bit corresponding to a wireless communication channel of the plurality of wireless communication channels is configured to indicate the availability mode of the second NAN device to communicate data over the wireless communication channel.

Example 149 includes the subject matter of Example 148, and optionally, wherein the channel bitmap comprises at least two bytes.

Example 150 includes the subject matter of Example 148 or 149, and optionally, wherein the channel bitmap comprises a bit set to a value to indicate whether or not the channel bitmap comprises one or more additional bytes corresponding to additional channels.

Example 151 includes the subject matter of any one of Examples 145-150, and optionally, wherein the message comprises an operating class field to indicate a frequency band of the plurality of wireless communication channels.

Example 152 includes the subject matter of any one of Examples 145-151, and optionally, wherein the message comprises an availability bitmap corresponding to a wireless communication channel of the plurality of wireless communication channels, the availability bitmap configured to indicate the availability mode of the second NAN device over the wireless communication channel during a plurality of time slots.

Example 153 includes the subject matter of Example 152, and optionally, wherein the availability bitmap comprises a plurality of bits corresponding to the plurality of time slots, a bit corresponding to a time slot indicates the availability mode of the second NAN device to communicate data over the wireless communication channel during the time slot.

Example 154 includes the subject matter of any one of Examples 142-153, and optionally, wherein the plurality of communication resources comprises one or more time resources.

Example 155 includes the subject matter of Example 154, and optionally, wherein the message comprises an indication of a plurality of time slots, the availability type indication is configured to indicate a capability of the second NAN device to be available to communicate data during the plurality of time slots.

Example 156 includes the subject matter of Example 155, and optionally, wherein the indication of the plurality of time slots comprises a bitmap comprising a plurality of bits corresponding to the plurality of time slots, a bit corresponding to a time slot indicates the capability of the second NAN device to be available to communicate data during the time slot.

Example 157 includes the subject matter of any one of Examples 142-156, and optionally, wherein the availability type indication is configured to indicate the availability mode of the second NAN device with respect to two or more communication resources of the plurality of communication resources.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. An apparatus comprising:
memory circuitry; and
a processor comprising logic and circuitry configured to cause a first Neighbor Awareness Networking (NAN) device to:
set a first availability entry to include a first availability type indication, first channel information, and first time information, wherein the first channel information is to indicate a first channel, and the first time information is to indicate one or more first time slots, wherein the first availability entry comprises a first entry control field comprising the first availability type indication to indicate that the first NAN device is committed to be available to communicate over the first channel during the one or more first time slots, said first availability entry comprising a first time bitmap comprising a first plurality of bits corresponding to a first respective plurality of time slots, the one or more first time slots to be indicated by one or more respective bits in the first time bitmap, which are to be set to "1";
set a second availability entry to include a second availability type indication, second channel information, and second time information, wherein the second channel information is to indicate a second channel, and the second time information is to indicate one or more second time slots, wherein the second availability entry comprises a second entry control field comprising the second availability type indication to indicate that the first NAN device prefers to, but is not committed to, be available to communicate over the second channel during the one or more second time slots, said second availability entry comprising a second time bitmap comprising a second plurality of bits corresponding to a second respective plurality of time slots, the one or more second time slots to be indicated by one or more respective bits in the second time bitmap, which are to be set to "1"; and transmit a NAN frame comprising the first and second availability entries to a second NAN device to schedule at least one channel and at least one time slot to communicate data with the second NAN device.

2. The apparatus of claim 1, wherein said first availability entry comprises a first channel bitmap comprising a first plurality of bits corresponding to a first respective plurality of channels, the first channel to be indicated by a respective bit in the first channel bitmap, which is to be set to "1", wherein said second availability entry comprises a second channel bitmap comprising a second plurality of bits corresponding to a second respective plurality of channels, the second channel to be indicated by a respective bit in the second channel bitmap, which is to be set to "1".

3. The apparatus of claim 2, wherein the first channel bitmap has a size of 2 octets, and the second channel bitmap has a size of 2 octets.

4. The apparatus of claim 1 configured to cause the first NAN device to set a third availability entry in the NAN frame to indicate that the first NAN device is to be unavailable to communicate over a third channel.

5. The apparatus of claim 1 configured to cause the first NAN device to receive from the second NAN device another NAN frame comprising an indication of at least one available channel and one or more available time slots for communication with the second NAN device.

6. The apparatus of claim 1 configured to cause the first NAN device to determine that the at least one channel to communicate data with the second NAN device is to include a common channel which is common to the first and second NAN devices, and that the one or more time slots to communicate data with the second NAN device are to include one or more common time slots which are common to the first and second NAN devices.

7. The apparatus of claim 1 comprising a radio.

8. The apparatus of claim 1 comprising one or more antennas.

9. A product comprising one or more tangible computer-readable non-transitory storage media comprising computer-executable instructions operable to, when executed by at least one processor, enable the at least one processor to cause a first Neighbor Awareness Networking (NAN) device to:

set a first availability entry to include a first availability type indication, first channel information, and first time information, wherein the first channel information is to indicate a first channel, and the first time information is to indicate one or more first time slots, wherein the first availability entry comprises a first entry control field comprising the first availability type indication to indicate that the first NAN device is committed to be available to communicate over the first channel during the one or more first time slots, said first availability entry comprising a first time bitmap comprising a first plurality of bits corresponding to a first respective plurality of time slots, the one or more first time slots to be indicated by one or more respective bits in the first time bitmap, which are to be set to "1";

set a second availability entry to include a second availability type indication, second channel information, and second time information, wherein the second channel information is to indicate a second channel, and the second time information is to indicate one or more second time slots, wherein the second availability entry comprises a second entry control field comprising the second availability type indication to indicate that the first NAN device prefers to, but is not committed to, be available to communicate over the second channel during the one or more second time slots, said second availability entry comprising a second time bitmap comprising a second plurality of bits corresponding to a second respective plurality of time slots, the one or more second time slots to be indicated by one or more respective bits in the second time bitmap, which are to be set to "1"; and transmit a NAN frame comprising the first and second availability entries to a second NAN device to schedule at least one channel and at least one time slot to communicate data with the second NAN device.

10. The product of claim 9, wherein the instructions, when executed, cause the first NAN device to receive from the second NAN device another NAN frame comprising an indication of at least one available channel and one or more available time slots for communication with the second NAN device.

11. The product of claim 9, wherein said first availability entry comprises a first channel bitmap comprising a first plurality of bits corresponding to a first respective plurality of channels, the first channel to be indicated by a respective bit in the first channel bitmap, which is to be set to "1", wherein said second availability entry comprises a second channel bitmap comprising a second plurality of bits corresponding to a second respective plurality of channels, the second channel to be indicated by a respective bit in the second channel bitmap, which is to be set to "1".

12. The product of claim 9, wherein the instructions, when executed, cause the first NAN device to set a third availability entry in the NAN frame to indicate that the first NAN device is to be unavailable to communicate over a third channel.

13. The product of claim 9, wherein the instructions, when executed, cause the first NAN device to determine that the at least one channel to communicate data with the second NAN device is to include a common channel which is common to the first and second NAN devices, and that the one or more time slots to communicate data with the second NAN device are to include one or more common time slots which are common to the first and second NAN devices.

14. A product comprising one or more tangible computer-readable non-transitory storage media comprising computer-executable instructions operable to, when executed by at least one processor, enable the at least one processor to cause a first Neighbor Awareness Networking (NAN) device to:

receive a NAN frame from a second NAN device, the NAN frame comprising at least a first availability entry and a second availability entry, the first availability entry comprises a first availability type indication, first channel information, and first time information, the second availability entry comprises a second availability type indication, second channel information, and second time information, wherein the first channel information is to indicate a first channel, and the first time information is to indicate one or more first time slots, wherein the first availability entry comprises a first entry control field comprising the first availability type indication to indicate that the second NAN device is committed to be available to communicate over the first channel during the one or more first time slots, wherein the second channel information is to indicate a second channel, and the second time information is to indicate one or more second time slots, wherein the second availability entry comprises a second entry control field comprising the second availability type indication to indicate that the second NAN device prefers to, but is not committed to, be available to communicate over the second channel during the one or more second time slots;

determine the one or more first time slots based on a first time bitmap in the first availability entry, the first time bitmap comprising a first plurality of bits corresponding to a first respective plurality of time slots, the one or more first time slots to be indicated by one or more respective bits in the first time bitmap, which are set to "1";

determine the one or more second time slots based on a second time bitmap in the second availability entry, the second time bitmap comprising a second plurality of bits corresponding to a second respective plurality of time slots, the one or more second time slots to be indicated by one or more respective bits in the second time bitmap, which are set to "1"; and determine at least one channel and at least one time slot to communicate data with the second NAN device based at least on the NAN frame from the second NAN device.

15. The product of claim 14, wherein the instructions, when executed, cause the first NAN device to determine the first channel based on a first channel bitmap in the first availability entry, and to determine the second channel based on a second channel bitmap in the second availability entry, the first channel bitmap comprising a first plurality of bits corresponding to a first respective plurality of channels, the first channel to be indicated by a respective bit in the first channel bitmap, which is set to "1", the second channel bitmap comprising a second plurality of bits corresponding to a second respective plurality of channels, the second channel to be indicated by a respective bit in the second channel bitmap, which is set to "1".

16. The product of claim 15, wherein the first channel bitmap has a size of 2 octets, and the second channel bitmap has a size of 2 octets.

17. The product of claim 14, wherein the NAN frame comprises a third availability entry to indicate that the second NAN device is to be unavailable to communicate over a third channel.

18. The product of claim 14, wherein the instructions, when executed, cause the first NAN device to transmit to the second NAN device another NAN frame comprising an indication of at least one available channel and one or more available time slots for communication by the first NAN device.

19. The product of claim 14, wherein the instructions, when executed, cause the first NAN device to determine that the at least one channel to communicate data with the second NAN device is to include a common channel which is common to the first and second NAN devices, and that the at least one time slot to communicate data with the second NAN device is to include at least one common time slot which is common to the first and second NAN devices.

20. An apparatus comprising:
means for causing a first Neighbor Awareness Networking (NAN) device to receive a NAN frame from a second NAN device, the NAN frame comprising at least a first availability entry and a second availability entry, the first availability entry comprises a first availability type indication, first channel information, and first time information, the second availability entry comprises a second availability type indication, second channel information, and second time information, wherein the first channel information is to indicate a first channel, and the first time information is to indicate one or more first time slots, wherein the first availability entry comprises a first entry control field comprising the first availability type indication to indicate that the second NAN device is committed to be available to communicate over the first channel during the one or more first time slots, wherein the second channel information is to indicate a second channel, and the second time information is to indicate one or more second time slots, wherein the second availability entry comprises a second entry control field comprising the second availability type indication to indicate that the second NAN device prefers to, but is not committed to, be available to communicate over the second channel during the one or more second time slots;

means for determining the one or more first time slots based on a first time bitmap in the first availability entry, the first time bitmap comprising a first plurality of bits corresponding to a first respective plurality of time slots, the one or more first time slots to be indicated by one or more respective bits in the first time bitmap, which are set to "1";

means for determining the one or more second time slots based on a second time bitmap in the second availability entry, the second time bitmap comprising a second plurality of bits corresponding to a second respective plurality of time slots, the one or more second time slots to be indicated by one or more respective bits in the second time bitmap, which are set to "1"; and means for determining at least one channel and at least one time slot to communicate data with the second NAN device based at least on the NAN frame from the second NAN device.

21. The apparatus of claim 20 comprising means for determining that the at least one channel to communicate data with the second NAN device is to include a common channel which is common to the first and second NAN devices, and that the at least one time slot to communicate data with the second NAN device is to include at least one common time slot which is common to the first and second NAN devices.

22. The apparatus of claim 20 comprising means for determining the first channel based on a first channel bitmap in the first availability entry, and for determining the second channel based on a second channel bitmap in the second availability entry, the first channel bitmap comprising a first plurality of bits corresponding to a first respective plurality of channels, the first channel to be indicated by a respective bit in the first channel bitmap, which is set to "1", the second channel bitmap comprising a second plurality of bits corresponding to a second respective plurality of channels, the second channel to be indicated by a respective bit in the second channel bitmap, which is set to "1".

23. The apparatus of claim 20, wherein the NAN frame comprises a third availability entry to indicate that the second NAN device is to be unavailable to communicate over a third channel.

* * * * *